(12) United States Patent
Barrett, Jr. et al.

(10) Patent No.: US 6,218,973 B1
(45) Date of Patent: Apr. 17, 2001

(54) BINARY RANDOM NUMBER GENERATOR

(75) Inventors: Raymond Louis Barrett, Jr., Ft. Lauderdale; Barry W. Herold, Boca Raton, both of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/262,933

(22) Filed: Mar. 5, 1999

(51) Int. Cl.[7] .................................................. H03M 3/00
(52) U.S. Cl. ................................. 341/143; 375/216
(58) Field of Search .......................... 341/143; 375/216, 375/259, 355, 230; 330/85

(56) References Cited

U.S. PATENT DOCUMENTS

| | | | | |
|---|---|---|---|---|
| 4,504,958 | * | 3/1985 | Tambureli | 375/230 |
| 4,866,442 | * | 9/1989 | Steim et al. | 341/143 |
| 4,902,982 | * | 2/1990 | Moore et al. | 330/85 |
| 5,068,659 | * | 11/1991 | Sakaguchi | 341/143 |
| 5,548,286 | * | 8/1996 | Craven | 341/155 |
| 5,592,508 | * | 1/1997 | Cooper | 341/143 |
| 5,812,605 | * | 9/1998 | Smith et al. | 375/308 |

OTHER PUBLICATIONS

Shuxian, Wu, *Chua's Circuit Family*, Aug. 1987, pp. 1022–1032.

Delgado–Restituto, Manuel et al, *Design Considerations for Integrated Continous–Time Chaotic Oscillators*, 1998, pp. 481–495.

* cited by examiner

*Primary Examiner*—Peguy JeanPierre
*Assistant Examiner*—Jean Bruner Jeanglaude (57) ABSTRACT

A random number generator includes a sample clock having a sample clock rate, a chaotic oscillator having a characteristic upper frequency, and an output section. The chaotic oscillator includes a quantized linear section and a non-linear section. The quantized linear section includes multiple quantized integrators coupled to the sample clock and inter-coupled in a linear intercoupling. The non-linear section is coupled in a feedback manner with the quantized linear section. The output section generates a random binary output signal having the sample clock rate, formed by a logical combination of binary signals, of which one binary signal is generated by each of the multiple quantized integrators. Each quantized integrator includes an analog to digital converter that preferably includes a sigma delta converter that generates one of the binary signals.

21 Claims, 6 Drawing Sheets

BINARY RANDOM NUMBER GENERATOR

FIELD OF THE INVENTION

This invention relates in general to electronic circuits for generating a random value, and in particular to electronic circuits for generating a binary random signal.

BACKGROUND OF THE INVENTION

The need for highly secure radio and wireline communications in smaller products is increasing, due in part to the increased desire to use the communications for business and financial transactions, and due in part to the widespread use of smaller two way radios. A vital factor in attaining highly secure communication is the availability of number generators that are essentially purely random. A variety of electronic circuits exist to generate numbers that are random to varying degrees. Random numbers are commonly generated in the form of a binary signal having a sample clock rate, $f_s$ Hertz (Hz). One characteristic of an ideal random binary signal is a spectral energy density that is uniform from 0 Hz (DC) to $f_s/2$. Another characteristic of an ideal random binary signal is a lack of deterministic behavior.

There are a variety of circuits that generate clocked binary signals that are within varying degrees of being close to ideal in their measure of randomness. For example, there are circuits based on diode noise that are quite good in this respect. However, they typically suffer from a susceptibility to intentional radio frequency (RF) interference, wherein the RF interference is intentionally deterministic and causes the circuit to become more deterministic, and thus less random. In another example, radioactive decay provides a good source of random values, but the radioactive source is complicated to handle (shield), and the operation of the electronic circuit used to convert the physical effect into an electronic signal, and the operation of other surrounding circuits, can be susceptible to malfunction from the radiation. Other electronic circuits that rely less directly on such fundamental effects generally provide signals that are more deterministic and that exhibit less uniform spectral energy density.

One type of electronic circuit that provides a chaotic signal having some desirable random characteristics is a third order Chua's oscillator, comprising a third order linear circuit coupled to a non-linear diode-like element having a negative slope in the diode transition region. In one configuration of Chua's oscillator, the non-linear diode-like element is implemented using operational amplifiers. Chua's oscillator circuit provides a chaotic signal when the circuit is operating in a chaotic mode, in which the oscillations of the circuit chaotically alter around phase space points called, in chaotic theory, the "attractors" of the circuit. The frequency spectrum of Chua's oscillator circuit is fairly uniformly distributed from DC up to a frequency, termed herein the upper characteristic frequency, that is dependent on the values of the linear elements and the shape of the input-output function of the non-linear element. Chua's oscillator comprises conventional linear devices (e.g., resistors, capacitors, and inductors) to establish the linear parameters, and it is susceptible to production and environmental variations of the values of the linear devices that can cause the oscillator to stop oscillating, or oscillate around only one of the attractors, occurrences that render it essentially useless. Furthermore, the operation of the circuit is deterministic, which makes it non-ideal for use in situations demanding high security.

Attempts have been made to eliminate the problem in Chua's oscillator of the loss of chaotic behavior due to variations of the circuit element values, while also eliminating another problem—the physical size of passive elements (capacitors, inductors). The attempts include an integrated circuit implementation using a circuit topology that is designed using state-variable synthesis. This approach, described in a technical paper by A. Rodriguez-Vasquez and M Delgado-Restituto, entitled "Design Considerations for Integrated Continuous-Time Chaotic Oscillators," IEEE Trans. Circuits Syst. I vol. 45, pp. 481–495, April 1998, makes use of transconductors and capacitors that are more optimal for an integrated circuit implementation. However, it does not eliminate the deterministic characteristics of the chaotic behavior.

Thus, what is needed is a binary random signal that is non-deterministic and has white noise characteristics over a wide frequency range.

DETAILED DESCRIPTION OF THE PREFERRED EMBODIMENT

Figure 1:
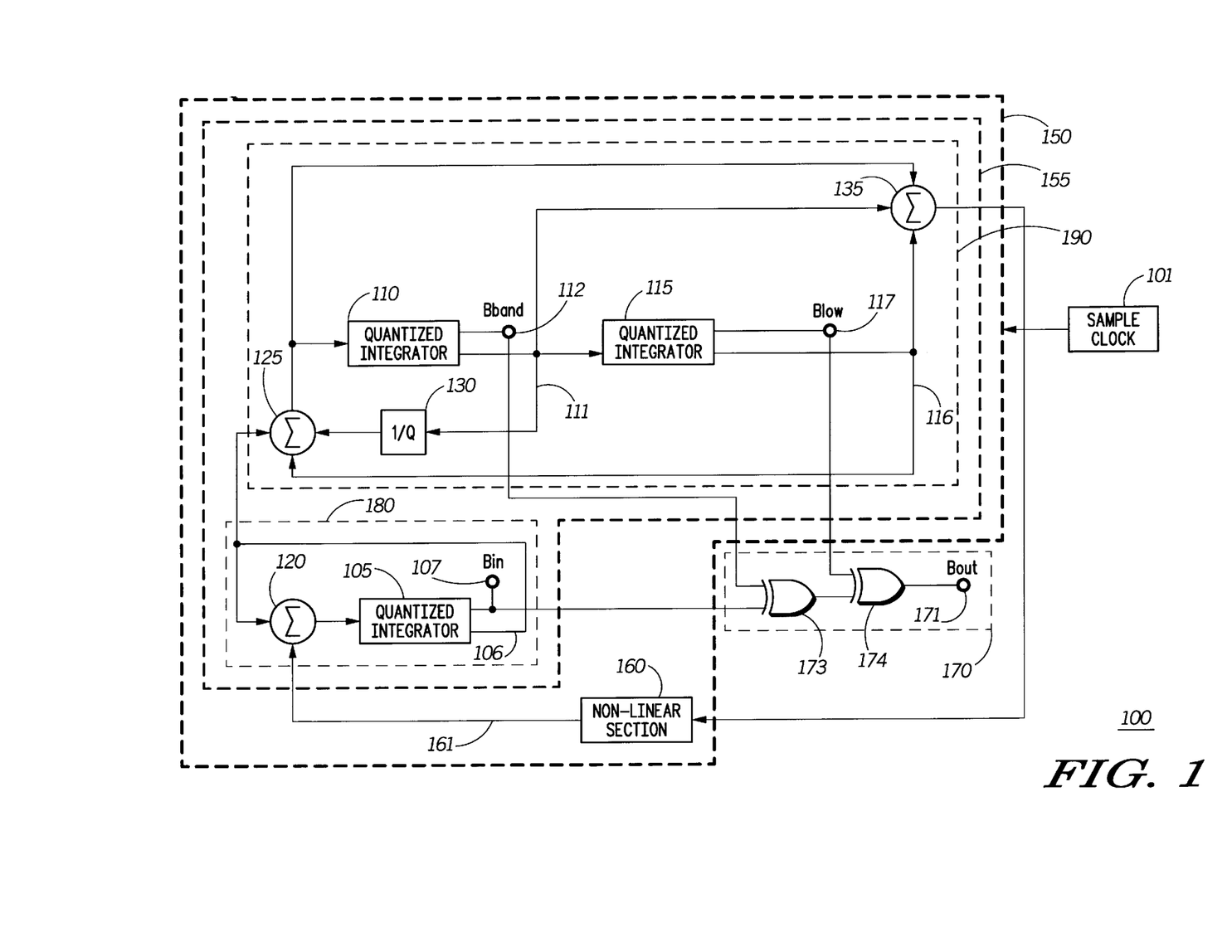
FIG. 1 is an electrical block diagram of a random number generator, in accordance with the preferred embodiment of the present invention.

Referring to FIG. 1, an electrical block diagram of a random number generator 100 is shown, in accordance with the preferred embodiment of the present invention. The random number generator 100 is a modified chaotic oscillator comprising multiple unique quantized integrators 105, 110, 115. The random number generator 100 comprises a chaotic oscillator 150, an output section 170, and a sample clock 101 having a sample clock rate, $f_s$. The chaotic oscillator 150 comprises a quantized linear section 155 and a non-linear section 160. The quantized linear section 155 is preferably constructed as a state variable circuit, using one quantized integrator 105, 110, or 115 to generate each state variable 106, 111, 116 and an associated binary signal 107, 112, 117. An essentially random binary output signal 171 is generated at a binary output of the output section 170. In accordance with the preferred embodiment of the present invention, the integrators 105, 110, 115 in the quantized linear section 155 are unique by being designed to generate quantization noise in the respective state variable signals 106, 111, 116 and binary signals 107, 112, 117, and are therefore referred to herein as quantized integrators. In prior art chaotic circuits such as a Chua's oscillator, wherein conventional non-quantized circuit elements are used, the Chua's oscillator operates in a chaotic mode and produces a chaotic signal having a fairly uniform spectral energy density from zero Hertz (i.e., DC) to an upper characteristic frequency of the Chua's oscillator, $f_c$, whereat the spectral energy quickly diminishes in value as the frequency of measurement increases. Such chaotic behavior is very sensitive to changes in values of the circuit elements; changes as small as 0.05% cause differing chaotic trajectories in the phase space, and changes significantly larger can cause the oscillator to stop oscillating chaotically, or entirely.

In accordance with the preferred embodiment of the present invention, the non-linear section 160 and the unique quantized integrators 105, 110, 115 of the quantized linear section 155 are intercoupled to emulate a chosen one of a set of Chua's oscillators that operate in a chaotic mode, and therefore the random binary output signal 171 has characteristics that arise from operating in the same chaotic manner. These characteristics include 1) quite uniform spectral energy density from nearly DC, up to an upper characteristic frequency, $f_c$, that is essentially the same for both the present invention and the conventional Chua's oscillator, 2) poles, zeroes, and Q's of the quantized linear section 155 of essentially the same values as those in of the conventional Chua's oscillator, 3), and attractors at essentially the same phase space points for both the random number generator 100 and the conventional Chua's oscillator. The design of the intercoupling of the unique quantized integrators 105, 110, 115 to achieve emulation of the linear portion of the chosen Chua's oscillator is accomplished using standard state variable techniques for emulating linear circuits as if conventional integrators were being used, and by designing piecewise linear characteristics of the non-linear section 160 to be essentially the same as those of a non-linear section of the conventional Chua's oscillator. It will be appreciated that the term "essentially the same" used in the previous two sentences encompasses a situation in which the parameters of the emulated circuit are uniformly scaled, in a manner well known to one of ordinary skill in the art.

Figure 2:
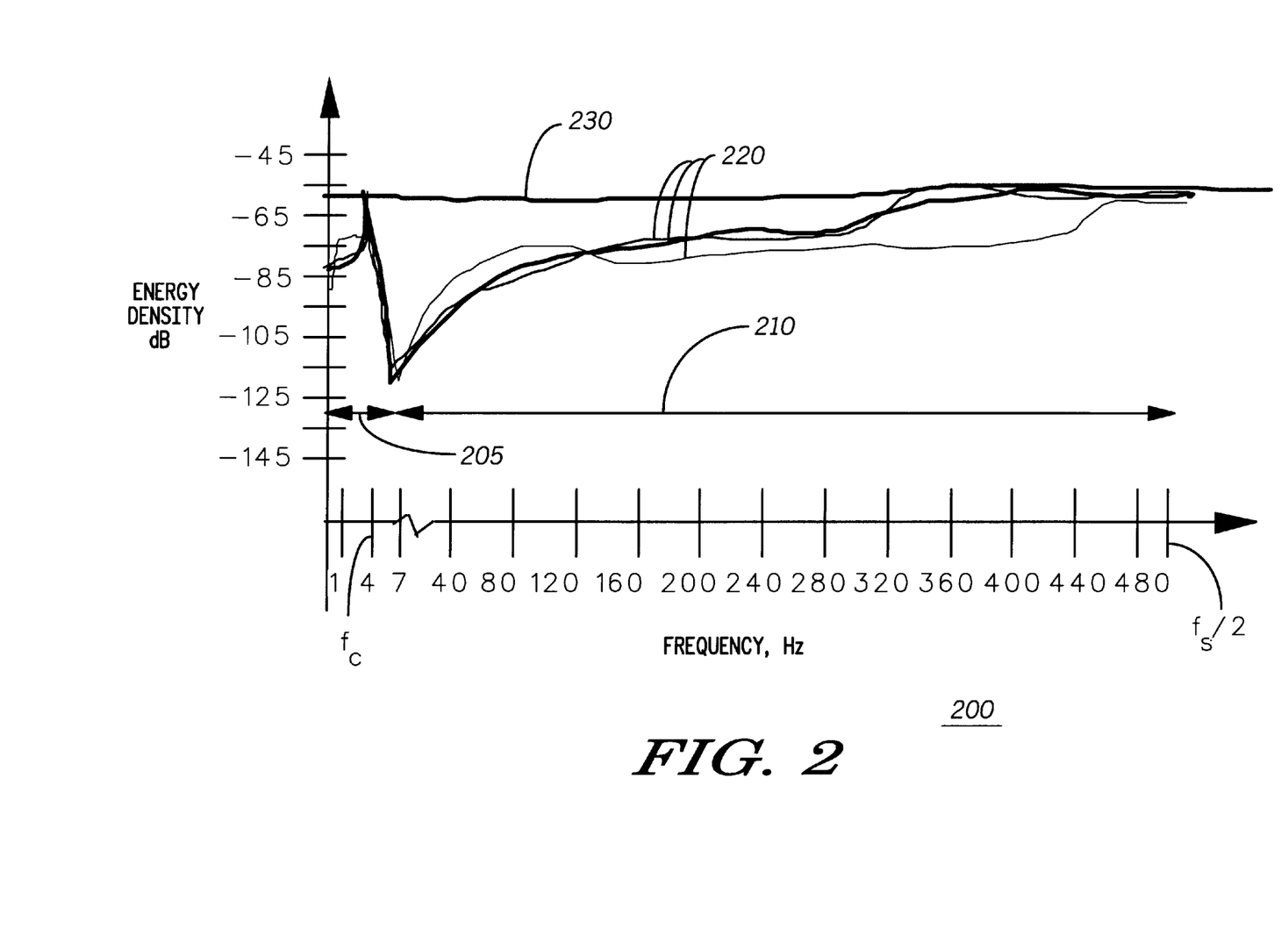
FIG. 2 is a spectral energy density graph that includes curves illustrating the spectral energy density of noise contributed by various aspects of the random number generator, in accordance with the preferred and alternative embodiments of the present invention.

Referring to FIG. 2, a spectral energy graph illustrates spectral energy densities of signals in the random number generator 100, in accordance with the preferred and alternative embodiments of the present invention. The horizontal axis has been expanded at frequencies below 7 kiloHertz (kHz) for clarity. The spectral energy density of the state variable signals 106, 111, 116 are illustrated by curves 220 and the spectral energy density of the random binary output signal 171 is illustrated by curve 230. The spectral energy density contributed by the chaotic oscillator operation of the random number generator 100 is shown in a region herein called the chaotic operation frequency region 205, which extends essentially from DC to the upper characteristic frequency, $f_c$. The spectral energy density contributed by the quantized linear section 155 is shown in a region called herein the quantization noise region 210, which extends essentially from $f_c$ to $f_s/2$. In this example, $f_c$ is approximately 4 kHz, and $f_s/2$ is 500 kHz. The random binary output signal 171 also has a characteristic (not shown in the figures) that is substantially different than that produced by prior art chaotic oscillators: the random binary output signal 171 of the random number generator 100 is a much less deterministic signal than that of a prior art chaotic oscillator that does not use quantized integrators.

The unique quantized integrators 105, 110, 115 introduce quantization noise into the binary signals 107, 112, 117, and into the state variable signals 106, 111, 116. The binary signals are added together in a binary manner by the output section 170 to generate the random binary output signal 171, which therefore also has quantization noise in it. In this example, the binary signals 107, 112, 117 are combined using an exclusive or operation. The binary signals 107, 112, 117 and state variable signals 106, 111, 116 generated by the integrators 105, 110, 115 are unique because an analog to digital converter is included in each of the quantized integrators 105, 110, 115. The analog to digital converter is preferably a sigma delta converter, but other types of analog to digital converters could be used, such as flash analog to digital converters. When the preferred sigma delta converter is used for the analog to digital converter, the spectral energy density of the quantization noise exhibits well known characteristics of sigma-delta converters, being minimal at low frequencies and generally increasing with increasing frequency, up to one half of $f_s$. The quantization noise shown in the quantization noise region 210 of FIG. 2 is typical of such analog to digital converters based on sigma delta converters. Because multiple quantized integrators 105, 110, 115 are used in the random number generator 100 to generate the multiple state variable signals, the quantization noise generated by each of the quantized integrators 105, 110, 115 is combined with the quantized noise generated by the others to produce the random binary output signal 171, and in accordance with the central limit theorem, the randomness of the noise in the random binary output is improved by the combination of the noise from the three sources, and the resulting spectral energy density can be designed to be essentially flat from DC to $f_s/2$ by proper design of the sample clock rate, $f_s$. The sample clock rate, $f_s$, is experimentally determined at a frequency that is sufficiently low so that the spectral energy density 230 of the random binary signal is sufficiently flat. At higher frequencies, a relative minimum, or "dip" forms in the spectral energy density 230 of the random binary signal at the frequency (approximately 7 kHz in FIG. 2), so another way to make this statement is that a maximum value of $f_s$ is experimentally determined below which the spectral energy density 230 of the random binary signal has a relative minimum that is no greater than a first predetermined value, for example, 3 db. Furthermore, the sample clock rate, $f_s$, is experimentally determined to be sufficiently higher than $f_c$ so that no substantial changes to the chaotic operation are introduced in comparison to the chaotic operation of the emulated circuit. A way to achieve this result is by making experimental determination of a minimum value of $f_s$ which keeps a ratio of signal to noise of any of the state variable signals 106, 111, 116, measured over the chaotic operation frequency region 205, above a second predetermined minimum value, for example, 10 decibels (dB). The frequency range between the minimum value and maximum value for $f_s$ is herein referred to as the optimum sample clock frequency range for the sample clock rate.

Because the state variable signals 106, 111, 116 have the characteristics described above that are caused by the operation of the random number generator 100 in the chaotic oscillator mode, the random binary output signal 171 is a very good random signal, having essentially white noise characteristics up to one half of $f_s$, as shown by curve 230 in FIG. 2, and being an essentially non-deterministic signal.

It will be appreciated that the present invention is also useful to generate improved randomized output signals from chaotic oscillator circuits other than those that emulate one of the set of Chua's oscillators, when such chaotic oscillator circuits are designed using a plurality of quantized integrators.

In summary, then, the random number generator 100 comprises a sample clock 101 having a sample clock rate; a chaotic oscillator 150 having a characteristic upper frequency, and an output section 170 that generates a random binary output signal 171 at an output having the sample clock rate. The chaotic oscillator 150 comprises a quantized linear section 155 and a non-linear section 160. The quantized linear section 155 comprises multiple quantized integrators 105, 110, 115, coupled to the sample clock 101 and intercoupled in a linear intercoupling. The non-linear section 160 is coupled in a feedback manner with the quantized linear section 155. The random binary output signal 171 is formed by a logical combination of a binary signal 107, 112, 117 of each of the multiple quantized integrators 105, 110, 115. The sample clock rate, $f_s$, is in an optimum sample clock frequency range having a maximum value and a minimum value. The maximum value is a sample clock rate below which a relative minimum of the spectral energy density of the random binary signal is below a first predetermined value. The minimum value is a sample clock rate above which a signal to noise ratio of each of the state variable signals, over the chaotic operation frequency region 205, is greater than a second predetermined value.

In more detail, the linear intercoupling comprises an intercoupling of the state variable signal 106, 111, 116 of each of the multiple quantized integrators 105, 110, 115 and an output signal 161 of the non-linear section 160 to inputs of the multiple quantized integrators 105, 110, 115 and the non-linear section 160, using at least one gain scaling circuit 130 that reduces the magnitude of state variable signal 111 and using summing circuits 120, 125. It will be appreciated that typically there is at least one gain scaling circuit (not shown in FIG. 2) associated with each quantized integrator 105, 110, 115, and the non-linear section 160. These circuits are well known to one of ordinary skill in the art for achieving an emulation of the Chua's oscillator in the chaotic mode. It will be further appreciated that in alternative embodiments of the present invention, in which other conventional chaotic oscillators are emulated by quantized integrators coupled in a state variable configuration, there may be fewer or more summing circuits and gain scaling circuits than in the preferred embodiment. The linear intercoupling of the three quantized integrators 105, 110, 115 implements a third order quantized linear section 155 having poles and zeroes that are essentially the same as those of one of a set of third order Chua's oscillators. The non-linear section 160 is characterized by non-linear parameters that provide non-linear characteristics essentially equivalent to those of the one of the set of third order Chua's oscillators.

The quantized linear section 155 is intercoupled as a state variable filter comprising a first order circuit 180 and a second order circuit 190. The first order circuit 180 comprises the first quantized integrator 105, has a first order characteristic frequency, and generates the first state variable signal 106. The output signal 161 of the non-linear section 160 is coupled to an input of the first order circuit 180. The second order circuit 190 comprises the second quantized integrator 110 and the third quantized integrator 115, has a second order characteristic frequency and an associated Q (the well known measure of resonance), and generates the second state variable signal 111 and the third state variable signal. The state variable signal 106 of the first order circuit 180 is coupled to an input of the second order circuit 190. The first, second, and third state signals are linearly combined to form an input of the non-linear section.

In particular, the first state variable signal 106 is summed in summing circuit 120 with the output signal 161 of the non-linear section 160 to form an input of the first quantized integrator 105. The second state variable signal 111 is coupled to an input of the third quantized integrator 115. The second state variable signal 111 is reduced by a factor of 1/Q by the gain scaling circuit 130 and the reduced signal is summed in summing circuit 125 with the first and third state variable signals 106, 116 to form an input of the second quantized integrator 110. The binary signals 107, 112, 117 generated at outputs of the three quantized integrators 105, 110, 115 are combined in an exclusive or operation by exclusive or gates 173, 174 to form the random binary output signal 171.

Figure 3:
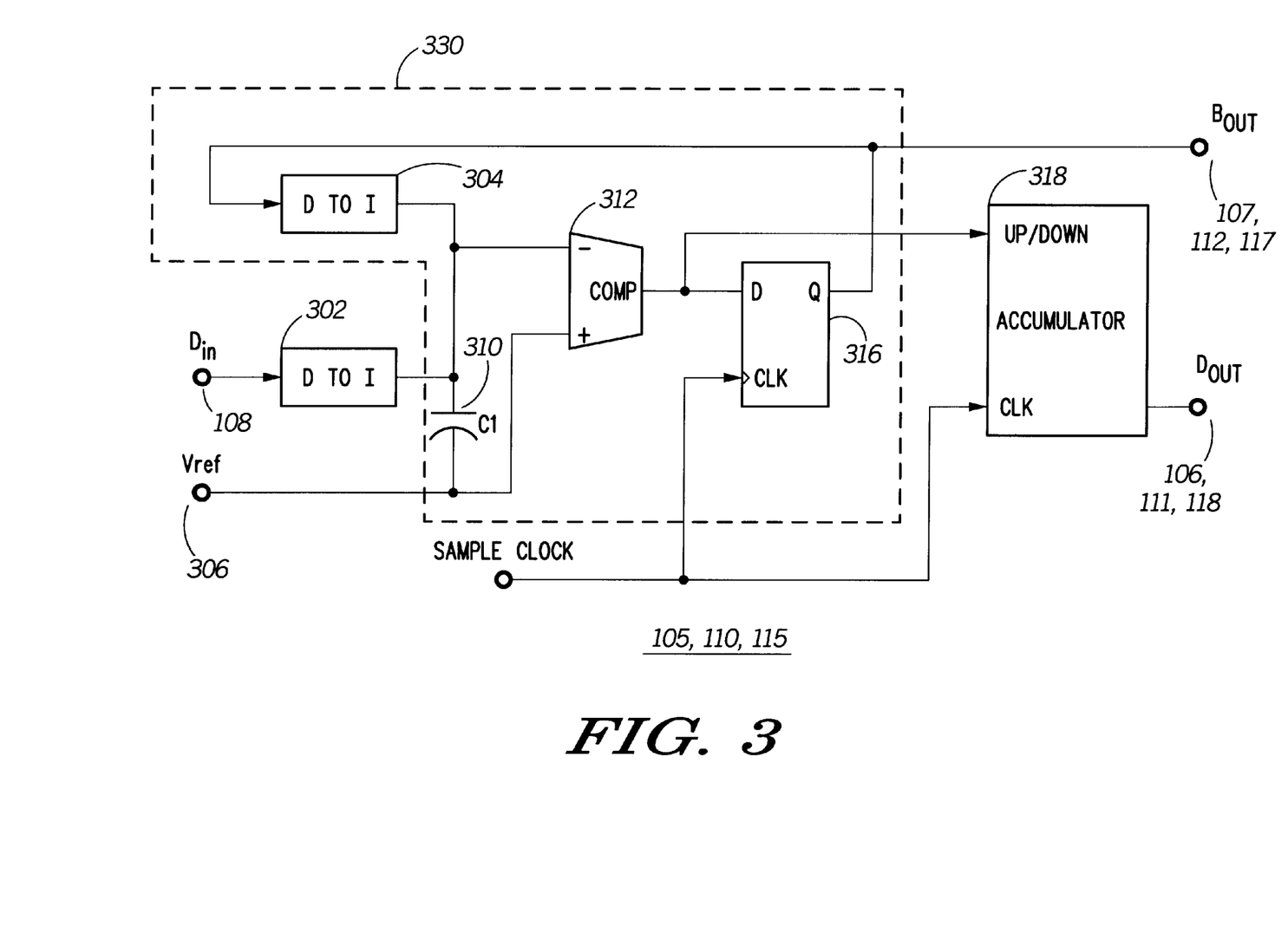
FIG. 3 is an electrical block diagram of a digital-analog-digital quantized integrator used in the random number generator, in accordance with the preferred embodiment of the present invention.

Referring to FIG. 3, an electrical block diagram of the quantized integrators 105, 110, 115 is shown, in accordance with the preferred embodiment of the present invention. The quantized integrators 105, 110, 115 are unique digital-analog-digital quantizing circuits, having digital inputs and generating digital state variable signals 106, 111, and 116. Accordingly, the summing circuits 120, 125, 135 are conventional digital summing circuits, the gain scaling circuit 130 is a conventional digital gain scaling circuit, and the non-linear section 160 is a conventional digital non-linear section. The quantized integrators 105, 110, 115 are circuits of identical design, and vary in implementation only due to manufacturing and environmental variations in analog circuit elements (e.g., capacitor C1 310, comparator 312) that are included therein. The quantized integrators 105, 110, 115 each comprise a conventional digital to analog converter 302 to which the digital input ($D_{IN}$) 108 of the quantized integrator 105, 110, 115 is coupled, an analog to digital converter 330 coupled to the sample clock 101 and coupled to an output of the digital to analog converter 302, that generates the binary signal ($B_{OUT}$) 107, 112, 117; and an accumulator circuit 318, coupled to the sample clock 101 and the analog to digital converter 330, that generates the (digital) state variable signal ($D_{OUT}$) 106, 111, 118.

The analog to digital converter 330 preferably comprises a sigma-delta modulator circuit that comprises a digital to analog converter 304, a capacitor 310, a comparator 312, and a D flip-flop 316 that are conventional circuits coupled in a conventional sigma delta configuration. One input of the comparator 312 and one terminal of the capacitor 310 are coupled to a reference voltage 306, such as battery minus. The other terminal of the capacitor is coupled to the analog output of the digital to analog circuit 302, to the analog output of the digital to analog circuit 304, and to a second input of the comparator 312. The output of the comparator 312 is coupled to a D input of the D flip-flop 316 and an UP/DOWN input of the accumulator 318. A Q output of the D flip-flop 316 is coupled to a digital input of the digital to analog converter 304. The Q output of the D flip-flop 316 is the binary signal 107, 112, 117 of the quantized integrator 105, 110, 115. The D flip-flop 316 is clocked by the sample clock 101.

The digital to analog converter 304 is preferably a single bit converter, but higher order converters can be alternatively used, in which case the design of the analog to digital converter 330 is made more complex in a manner well known to one of ordinary skill in the art. For example, a number of comparator stages and D flip flop registers would be used where the number of D flip flop registers equal to the number of bits used from the digital to analog converter 304. In this instance, the binary signals 107, 112, 117 (and therefore also the random binary output signal 171) are multi bit parallel signals of the same width as the digital to analog converter 304. The additional complexity for using multiple bits in the digital to analog converter 304, the comparator 312, and the D flip flop 316 might be warranted, for example, if the sample clock rate without the use of multiple bits was beyond a maximum rate specified for the types of parts used in the design of the quantized integrators 105, 110, 115. The digital to analog converter 302 and accumulator 318 are wide devices, preferably 12 bits wide, in order to produce output signals that have signal level quantization errors that are small enough to prevent mis-operation of the chaotic oscillator 150; that is to say, the bit width of those circuits is chosen to keep the signal to noise ratio induced by the quantization performed by those circuits above a predetermined minimum, for example 33 dB (which relates to the 0.05% error mentioned above). The value of the capacitor is chosen in a conventional manner to prevent the outputs of the digital to analog converters 304, 302 from charging or discharging the capacitor beyond reference voltages coupled to the comparator 312.

In accordance with an alternative embodiment of the quantized integrator 105, 110, 115, (not shown in FIG. 3), the analog to digital converter 330 comprises a conventional flash analog to digital converter clocked by the sample clock 101. In this embodiment the UP/DOWN input of the accumulator 318 is coupled to an output bit of the conventional flash circuit, and the binary signal 107, 112, 117 is coupled to an output bit of the conventional flash circuit. Other conventional circuits can be used as the analog to digital converter 330, but may not provide as high quality random characteristics of the random binary output signal 171 as when the sigma delta modulator is used.

Figure 4:
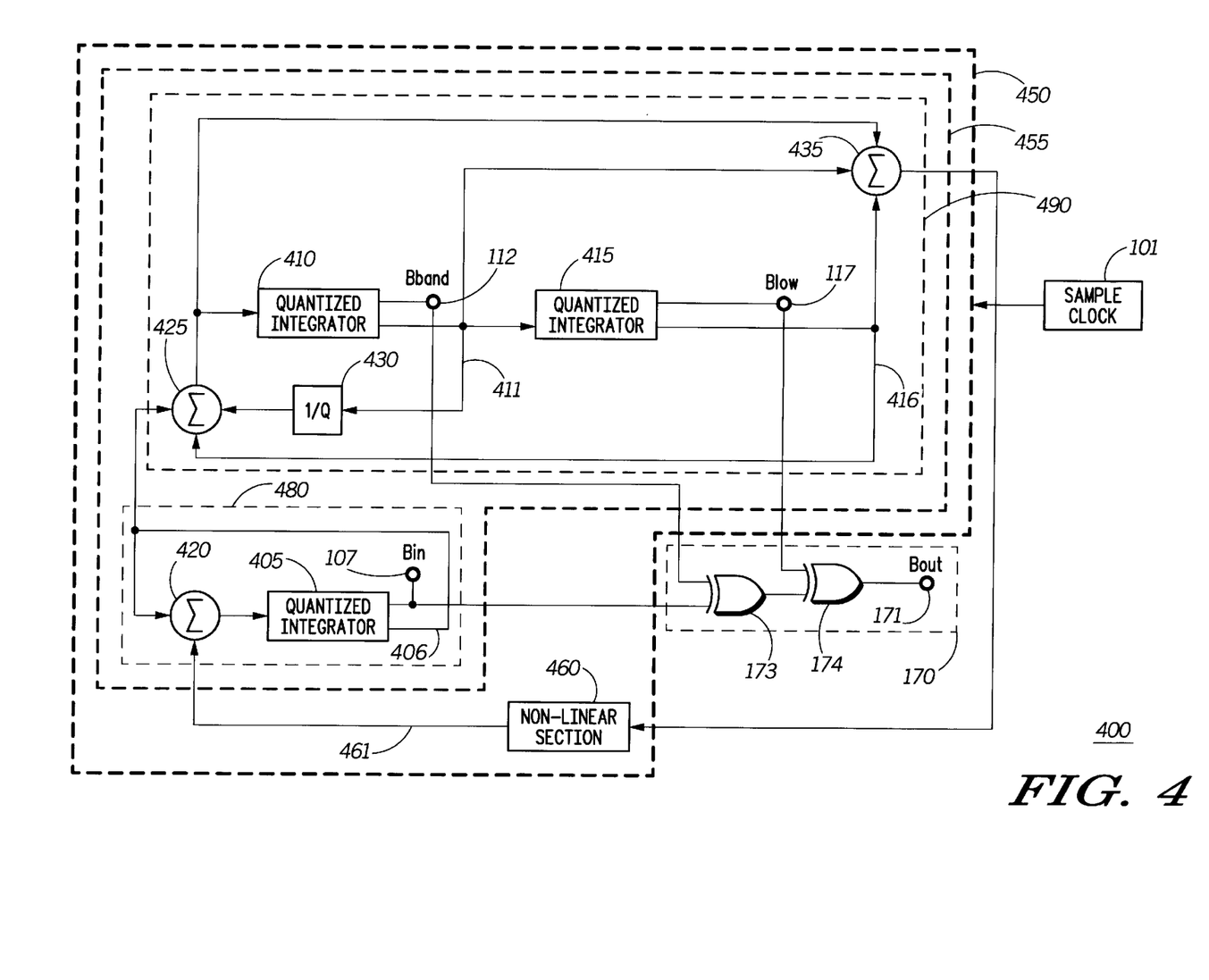
FIG. 4 is an electrical block diagram of a random number generator, in accordance with the alternative embodiment of the present invention.

Referring to FIG. 4, an electrical block diagram of a random number generator 400 is shown, in accordance with an alternative embodiment of the present invention. The random number generator 400 is a modified chaotic oscillator comprising multiple unique quantized integrators 405, 410, 115. The random number generator 400 comprises a chaotic oscillator 450, an output section 170, and a sample clock 101 having a sample clock rate, $f_s$. The chaotic oscillator 450 comprises a quantized linear section 455 and a non-linear section 460. The quantized linear section 455 is preferably constructed as a state variable circuit, using one quantized integrator 405, 410, or 415 to generate each state variable 406, 411, 416 and an associated binary signal 107, 112, 117. An essentially random binary output signal 171 is generated at a binary output of the output section 170. In accordance with the alternative embodiment of the present invention, the integrators 405, 410, 415 in the quantized linear section 455 are unique by being designed to generate quantization noise in the respective state variable signals 406, 411, 416 and binary signals 107, 112, 117. The significant difference between the random number generators 100 and 400 is that the quantized integrators in the random number generator 100 are digital-analog-digital integrators 105, 110, 115, while those in the random number generator 400 are analog-digital-analog quantized integrators 405, 410, 415. The functional operation, limitations, parameters, and caveats of the random number generator 400 are the same as those described with reference to FIGS. 1 and 2 above for the random number generator 100.

Figure 5:
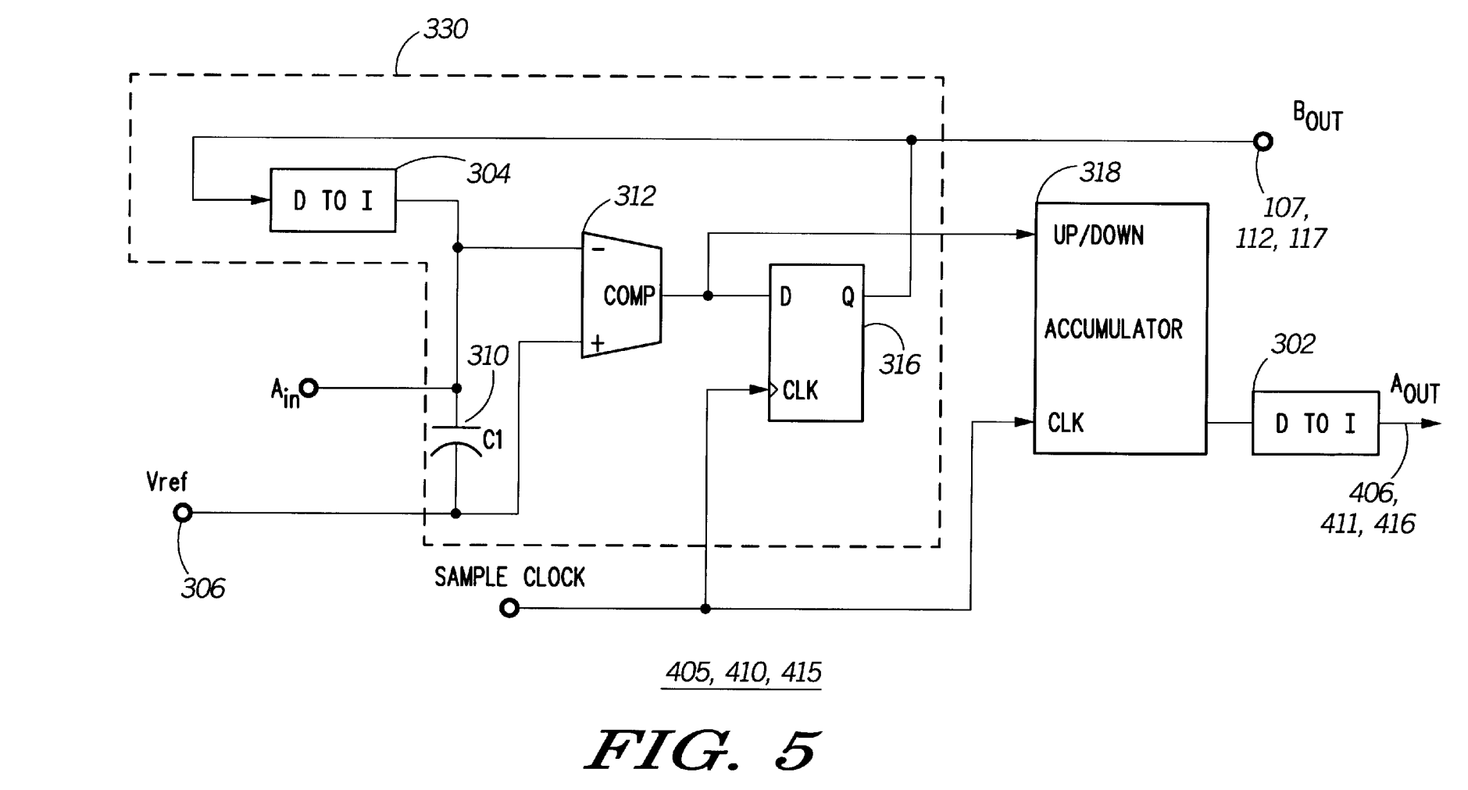
FIG. 5 is an electrical block diagram of an analog-digital-analog quantized integrator used in the random number generator, in accordance with the alternative embodiment of the present invention.

Referring to FIG. 5, an electrical block diagram of the quantized integrators 405, 410, 415 is shown, in accordance with the preferred embodiment of the present invention. The quantized integrators 405, 410, 415 are unique analog-digital-analog quantizing circuits, having analog inputs and generating analog state variable signals 406, 411, and 416. Accordingly, the summing circuits 420, 425, 435 are conventional analog summing circuits, the gain scaling circuit 430 is a conventional analog gain scaling circuit, and the non-linear section 460 is a conventional analog non-linear section. The quantized integrators 405, 410, 415 are circuits of identical design, and vary in implementation only due to manufacturing and environmental variations in analog circuit elements (e.g., capacitor C1 310, comparator 312) that are included therein. The quantized integrators 405, 410, 415 each comprise an analog to digital converter 330, a conventional accumulator circuit 318, and a conventional digital to analog converter 302. An analog input ($A_{IN}$) 108 of the quantized integrator 105, 110, 115 and the sample clock 101 are coupled to the analog to digital converter 330, that generates the binary signal ($B_{OUT}$) 107, 112, 117. An output of the analog to digital converter 330 and the sample clock are coupled to the accumulator circuit 318, that generates an output signal. Preferably, one bit of the output signal from the accumulator is coupled to a conventional digital to analog converter 302, and an output of the digital to analog converter 302 is the (analog) state variable output ($A_{OUT}$) 406, 411, 418.

The analog to digital converter 330 preferably comprises a sigma-delta modulator circuit that comprises a digital to analog converter 304, a capacitor 310, a comparator 312, and a D flip-flop 316 that are conventional circuits coupled in a conventional sigma delta configuration. One input of the comparator 312 and one terminal of the capacitor 310 are coupled to a reference voltage 306, such as battery minus. The other terminal of the capacitor is coupled to the analog input of the quantized integrator 405, 410, 415, to the analog output of the digital to analog circuit 304, and to a second input of the comparator 312. The output of the comparator 312 is coupled to a D input of the D flip-flop 316 and an UP/DOWN input of the accumulator 318. A Q output of the D flip-flop 316 is coupled to a digital input of the digital to analog converter 304. The Q output of the D flip-flop 316 is the binary signal 107, 112, 117 of the quantized integrator 405, 410, 415. The D flip-flop 316 is clocked by the sample clock 101.

In accordance with an alternative embodiment of the quantized integrator 405, 410, 415, (not shown in FIG. 4), the analog to digital converter 330 comprises a conventional flash analog to digital converter clocked by the sample clock 101. In this embodiment the UP/DOWN input of the accumulator 318 is coupled to an output bit of the conventional flash circuit, and the binary signal 107, 112, 117 is coupled to an output bit of the conventional flash circuit. Other conventional circuits can be used as the analog to digital converter 330, but may not provide as high quality random characteristics of the random binary output signal 171 as when the sigma delta modulator is used.

It will be appreciated that all analog portions of the random number generators 100, 400 can be implemented in either voltage mode devices or current mode devices, and that, by using the state variable approach to emulating the chosen chaotic oscillator, an extremely small and easily replicable single integrated circuit can be designed that embodies the preferred or alternative embodiment of the present invention, which are highly nondeterministic, and therefore external components and other measures are not necessary to ensure that two different devices initialize differently.

It will be further appreciated that a random number generator in accordance with another alternative embodiment of the present invention is possible in which the quantized integrators are all digital elements—that is, for example, the capacitor 310 and comparator 312 are realized as digital elements. In this other alternative embodiment, all circuits are purely digital. Although this approach still provides chaotic behavior and a spectral energy density that is characterized as nearly white noise, means are needed to avoid a high degree of deterministic behavior. For example, a non-volatile memory can be used to remember the state of the random number generator during times the selective call radio is turned off, to reduce the number of selective call radios that have been initialized within a time period. Other artifices can be used to cause the type of variations that are essentially unavoidable but highly desirable in the random number generators 100, 400, such as minor variations in the values of the capacitor 310, the switching point of the comparator 312, etc.

Figure 6:
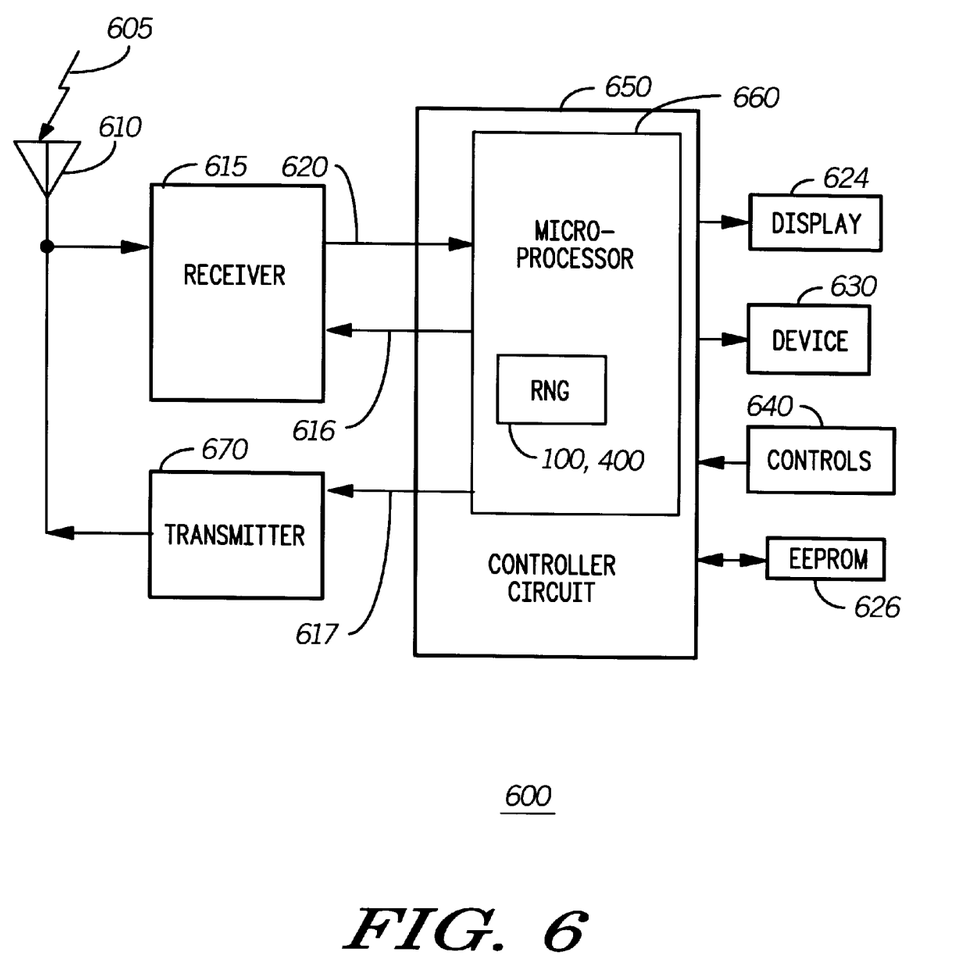
FIG. 6 is an electrical block diagram of a multichannel selective call radio that uses the random number generator, in accordance with the preferred and alternative embodiments of the present invention.

Referring to FIG. 6, an electrical block diagram of a multichannel selective call radio 600 is shown, in accordance with the preferred and alternative embodiment of the present invention. The selective call radio 600 comprises a receiver section 615, a transmitter section 670 and a controller circuit 650. A conventional antenna 610 intercepts radiated radio frequency (RF) signals 605 that are converted by the antenna 610 to conducted RF signals that are coupled to the receiver section 615. The receiver section 615 performs conventional receiving functions of filtering unwanted energy from the RF signal, converting the RF signal, and generating a demodulated signal 620 that is coupled to the controller circuit 650. The controller circuit 650 generates a control signal 616 that is coupled to the receiver section 615, for selecting a receive channel. The controller circuit 650 also generates a control signal 617 that is coupled to the transmitter section 670, that selects a transmit channel. The controller circuit 650 is also coupled to a display 624, an alert 630, a set of user controls 640, and an electrically erasable read only memory (EEPROM) 626. The controller circuit 650 comprises a microprocessor 660, as well as other circuits not shown in FIG. 1, such as power regulation circuits.

The microprocessor 660 is coupled to the EEPROM 626 for storing an embedded address and other configuration information that is stored therein during a maintenance operation, and the microprocessor 660 loads the embedded address during normal operations of the selective call radio 600. The microprocessor 660 is a digital signal processor of conventional circuit design, comprising a central processing unit (CPU), a read only memory (ROM), and a random access memory (RAM). The microprocessor comprises the random number generator (RNG) 100 in accordance with the preferred embodiment of the present invention or, alternatively, the random number generator (RNG) 400, in accordance with the alternative embodiment of the present invention.

Under normal operation, a conventional message processor function of the microprocessor 660 decodes an outbound selective call message, generating data words that have been coded within an outbound signaling protocol conveyed by the radio signal 605, and processes the outbound selective call message when an address received in an address field of the outbound signaling protocol matches the embedded address stored in the EEPROM 626, in a manner well known to one of ordinary skill in the art for a selective call radio. An outbound selective call message that has been determined to be for the selective call radio 600 by the address matching is processed by the message processor function according to the contents of the outbound message and according to modes set by manipulation of the set of user controls 640, in a conventional manner. An alert signal is typically generated when an outbound message includes user information. The alert signal is coupled to the alert device 630, which is typically either an audible or a silent alerting device.

When the selective call radio 600 is operating in a secure mode a conventional secure communication procedure is used, in which the selective call radio 600 uses a random number to mathematically manipulate a first secure message that is transmitted to another communication device by means of the transmitter section 670, and the random number is stored in the RAM of the microprocessor 660. The random number is used later to mathematically manipulate a second secure message received from the other communication device, and the results are used as a basis for secure communications between the selective call radio 600 and the other communication device. This use of a random number to assure secure communications is well known to one of ordinary skill in the art of secure communications, but it will be appreciated that the use of the random number generator 100, 400 to generate the random number used in this secure operation improves the security of the secure operation in comparison to prior art random number generators because of the high quality of randomness of the random numbers generated by the random number generator 100, 400.

It will be appreciate that the selective call radio 600 is representative of essentially any two way communication device that will benefit from an improved random number generator, be it a wireless communication device such as the selective call radio 600, or a computer operating over the Internet. It will be further appreciated that other uses for random numbers that are not two way secure communications will benefit from the random number generators 100, 400. For example, the random number generators 100, 400 will improve simulations performed by computers that rely on random numbers that are non-deterministic, such as network traffic simulations, or biological simulations, and will also improve the randomness of aloha retransmissions in communication systems that use a contention system of the aloha type.

By now it should be appreciated that there has been provided a new random number generator that provides highly random and highly non-deterministic numbers using a circuit configuration that is small, inexpensive, and easy to manufacture.

We claim:

1. A random number generator, comprising:
   a sample clock having a sample clock rate;
   a chaotic oscillator having a characteristic upper frequency, comprising
      a quantized linear section comprising multiple quantized integrators coupled to the sample clock and intercoupled in a linear intercoupling; and
      a non-linear section, coupled in a feedback manner with the quantized linear section; and
   an output section that generates a random binary output signal having the sample clock rate, formed by a logical combination of binary signals, of which one binary signal is generated by each of the multiple quantized integrators.

2. The random number generator according to claim 1,
   wherein the sample clock rate is within an optimum sample clock frequency range that has a maximum value and a minimum value, and
   wherein the maximum value is a sample clock rate below which a relative minimum of a spectral energy density of the random binary output signal is below a first predetermined value, and
   wherein the minimum value is a sample clock rate above which a signal to noise ratio of each of a state variable signal generated by the multiple quantized integrators, over a chaotic operation frequency region, is greater than a second predetermined value.

3. The random number generator according to claim 1, wherein the linear intercoupling comprises an intercoupling of state variable output signals of each of the multiple quantized integrators and an output signal of the non-linear section to inputs of the multiple quantized integrators and the non-linear section using summing circuits and at least one gain scaling circuit.

4. The random number generator according to claim 1, wherein the quantized linear section comprises three quantized integrators, and
wherein the linear intercoupling of the three quantized integrators implements a third order quantized linear section having poles and zeroes that are essentially the same as those of one of a set of third order chaotic oscillators, and
wherein the non-linear section is characterized by non-linear parameters that provide non-linear characteristics essentially the same as those of the one of the set of third order chaotic oscillators.

5. The random number generator according to claim 4, wherein the quantized linear section is intercoupled as a state variable filter comprising:
a first order circuit comprising a first of the three quantized integrators, having a first order characteristic frequency and generating a first state variable signal; wherein an output signal of the non-linear section is coupled to an input of the first order circuit, and
a second order circuit comprising a second and a third of the three quantized integrators and having a second order characteristic frequency and an associated Q, and generating a second state variable signal and a third state variable signal, wherein first state variable signal is coupled to an input of the second order circuit, and
wherein the first, second, and third state variable signals are linearly combined to form an input of the non-linear section.

6. The random number generator according to claim 5, wherein the first state variable signal is summed with the output signal of the non-linear section to form an input signal of a first of the three quantized integrator, and
wherein the second state variable signal is coupled to an input of a third of the three quantized integrator, and
wherein the second state variable signal is reduced by a factor of 1/Q by a gain scaling circuit and the reduced signal is summed with the first and third state variable signals to form an input signal of a second of the three quantized integrator, and
wherein the binary signals of the three quantized integrators are combined in an exclusive or operation to generate the random binary output signal.

7. The random number generator according to claim 6, wherein the three quantized integrators are digital-analog-digital quantizing circuits, wherein summing circuits are digital summing circuits, wherein the gain scaling circuit is a digital gain scaling circuit, and wherein the non-linear section is a digital non-linear section, all of which are clocked by the sample lock.

8. The random number generator according to claim 7, wherein each quantized integrator comprises:
a digital to analog converter coupled to an input of one of the three quantized integrators;
an analog to digital converter, coupled to the sample clock and an output of the digital to analog converter, that generates one of the binary signals; and
an accumulator circuit, coupled to the sample clock and the analog to digital converter, that generates one of the first, second, and third state variable signals.

9. The random number generator according to claim 8, wherein the analog to digital converter comprises a sigma-delta modulator circuit.

10. The random number generator according to claim 8, wherein the analog to digital converter comprises a flash analog to digital converter.

11. The random number generator according to claim 6, wherein the three quantized integrators are analog-digital-analog quantizing circuits clocked by the sample clock, wherein summing circuits are analog summing circuits, wherein the gain scaling circuit is an analog gain scaling circuit, and wherein the non-linear section is an analog non-linear section.

12. The random number generator according to claim 11, wherein each of the three quantized integrator comprises:
an analog to digital converter, coupled to the sample clock and an input of one of the three quantized integrator, that generates one of the binary signals;
an accumulator circuit, coupled to the sample clock and coupled to an output of the analog to digital converter, and
a digital to analog converter, coupled to the accumulator circuit, that converts an output of the accumulator circuit to one of the first, second, and third state variable signals.

13. The random number generator according to claim 12, wherein the analog to digital converter comprises a sigma-delta modulator circuit.

14. The random number generator according to claim 12, wherein the analog to digital converter comprises a flash analog to digital converter.

15. The random number generator according to claim 1, wherein each quantized integrator comprises:
a digital to analog converter coupled to an input of the quantized integrator;
an analog to digital converter, coupled to the sample clock and an output of the digital to analog converter, that generates one of the binary signals; and
an accumulator circuit, coupled to the sample clock and the analog to digital converter, that generates a state variable signal.

16. The random number generator according to claim 15, wherein the analog to digital converter comprises a sigma-delta modulator circuit.

17. The random number generator according to claim 1, wherein each quantized integrator comprises:
an analog to digital converter, coupled to the sample clock and an input of the quantized integrator, that generates one of the binary signals;
an accumulator circuit, coupled to the sample clock and coupled to an output of the analog to digital converter, and
a digital to analog converter, coupled to the accumulator circuit, that converts an output of the accumulator circuit to a state variable signal.

18. The random number generator according to claim 17, wherein the analog to digital converter comprises a sigma-delta modulator circuit.

19. The random number generator according to claim 1, wherein the random binary output signal and each of the binary signals are multibit parallel signals.

20. A communication device, comprising:
   a transmitter for transmitting a first secure message manipulated by a random number;
   a receiver for receiving a second secure message; and
   a controller comprising a microprocessor comprising a random number generator, comprising:
      a sample clock having a sample clock rate;
      a chaotic oscillator having a characteristic upper frequency, comprising
         a quantized linear section comprising multiple quantized integrators coupled to the sample clock and intercoupled in a linear intercoupling; and
         a non-linear section, coupled in a feedback manner with the quantized linear section; and
      an output section that generates a random binary output signal having the sample clock rate, formed by a logical combination of binary signals, of which one binary signal is generated by each of the multiple quantized integrators.

21. A computer, comprising a random number generator, comprising:
   a sample clock having a sample clock rate;
   a chaotic oscillator having a characteristic upper frequency, comprising
      a quantized linear section comprising multiple quantized integrators coupled to the sample clock and intercoupled in a linear intercoupling; and
      a non-linear section, coupled in a feedback manner with the quantized linear section; and
   an output section that generates a random binary output signal having the sample clock rate, formed by a logical combination of binary signals, of which one binary signal is generated by each of the multiple quantized integrators.

* * * * *